Dec. 30, 1958    A. T. HARRIS ET AL    2,866,670
SEAL FOR ANTI-FRICTION BEARINGS AND THE LIKE
Filed June 16, 1955
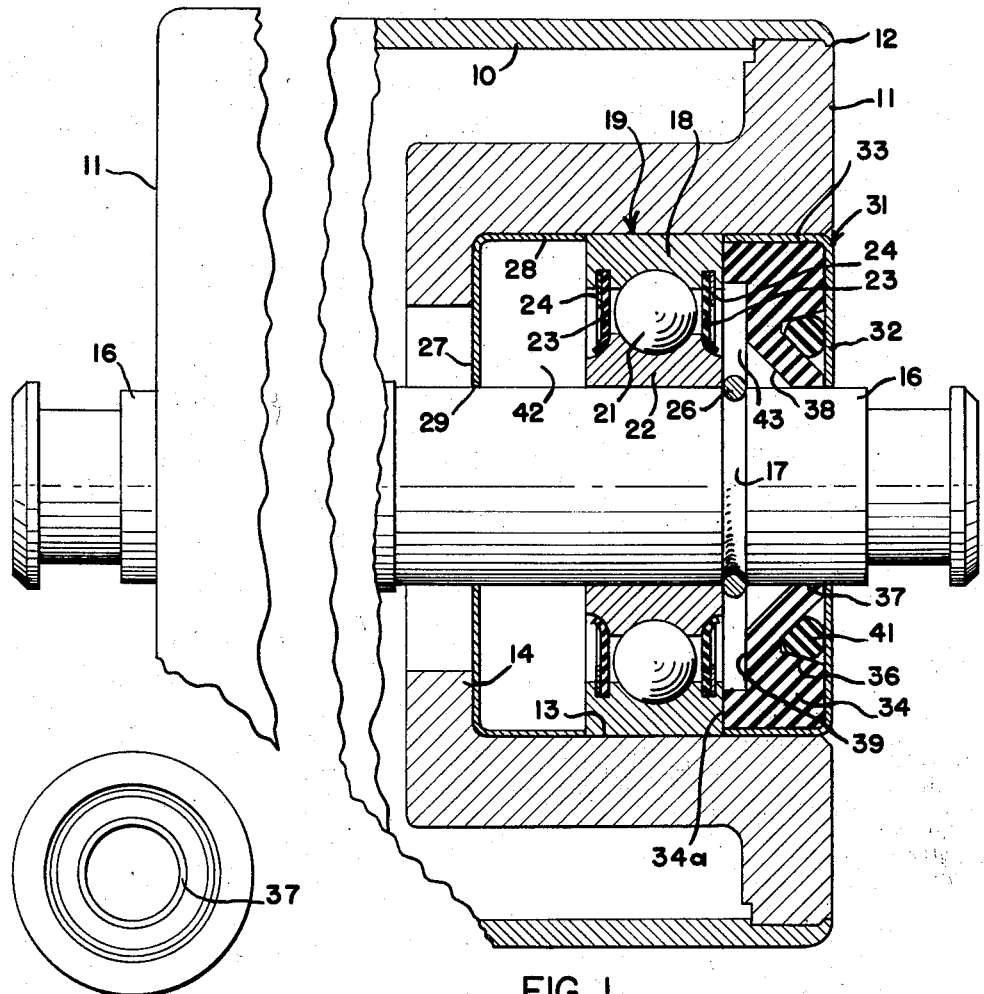
FIG. 1
FIG. 2
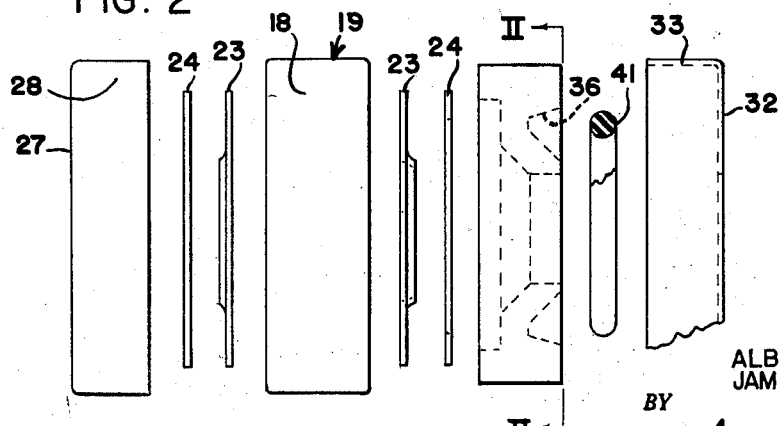
FIG. 3
INVENTORS
ALBERT T. HARRIS
JAMES Q. REYNOLDS
BY
*Jennings & Caster*
ATTORNEYS United States Patent Office
2,866,670
Patented Dec. 30, 1958

2,866,670

SEAL FOR ANTI-FRICTION BEARINGS AND THE LIKE

Albert T. Harris and James O. Reynolds, Birmingham, Ala., assignor to Transall, Incorporated, a corporation of Alabama Application June 16, 1955, Serial No. 515,974

3 Claims. (Cl. 308—187.1)

Our invention relates to seals for anti-friction bearings and the like and while not limited thereto relates particularly to seals for prolonging the life of anti-friction bearings which are equipped with the so-called built-in seals.

An object of our invention is to provide a seal which may be placed in the outer end of the bore of the hub in which the bearing is placed and through which the roll or bearing supporting axle passes, the seal being made of resilient material and having improved means causing a sealing ring portion thereof more effectively to seal the periphery of the centrally disposed, supporting axle.

More specifically, our invention contemplates a seal of resilient material such as rubber which has an annular sealing lip portion disposed with a contact running fit about the roll supporting axle, together with means positively and resiliently to contract the annular sealing lip about the axle, whereby the entry of foreign matter into the bore of the hub is materially reduced.

A still more specific object of our invention is to provide a seal for sealing an end of the bore of a hub or the like comprising an annular rubber seal, an annular groove in the outer face of the seal and the inner side of which is bounded by an annular sealing lip which encircles and contacts the axle which supports the hub, there being a rubber O-ring in the groove of a size to project slightly past the outer surface of the seal, whereby when the seal is placed in a metal cup and the cup pressed into the hub bore, the O-ring compresses the sealing lip about the axle, holding it firmly thereabout with a contact fit.

A further object is to provide a seal including a metallic cup disposed to be pressed into the bearing recess of a hub, a washer of resilient material in the cup having an annular groove on the face thereof adjacent the cup and an O-ring of resilient material in the groove, whereby when assembled about an axle the portion of the seal lying radially inwardly of the O-ring and surrounding the axle is tightened about the axle, forming an improved dirt excluding and grease retaining seal about the axle.

Apparatus illustrating the features of our invention is shown in the accompanying drawing forming a part of this application, in which:

Fig. 1 is a fragmental elevational view of a conveyor belt idler roll embodying our improved bearing seal, one end of the roll being in section;

Fig. 2 is an elevational view of the seal taken generally along line II—II of Fig. 3 and with the seal removed entirely from the mounting structure associated therewith; and Fig. 3 is a detail exploded view showing the several parts which make up our improved seal means and bearing assembly.

Referring now to the drawings for a better understanding of our invention we show our improved bearing seal assembly associated with an idler roll comprising an outer cylindrical shell 10. As will be understood the shell 10 is provided at each end with heads 11. The shell may be formed over the heads as indicated at 12, whereby there is provided an assembly in which the interior of the roll is substantially dirt and water tight.

In view of the fact that the heads, bearings and seals therein are identical a description of one will suffice for both. Each head is provided with a centrally disposed bore 13. The bore is provided at its rear end with a shoulder 14, the shoulder 14 serving to provide a stop for the assembly of parts as presently will appear.

Passing through the axial center of the idler roll and heads is a shaft 16 which, as will be understood, is non-rotatably supported in suitable brackets or the like not shown. The shaft 16 is provided with an annular groove 17, the purpose of which will later appear.

Mounted within the bore 13 of the hub is the outer race 18 of an anti-friction bearing indicated generally by the numeral 19. As will be understood the bearing comprises a plurality of balls 21 and an inner race 22. Further, the bearing comprises seals in the form of resilient washers 23, placed at each side of the bearing. Metal retaining washers 24 hold the seals 23 in place. The inner race 22 is pressed onto the shaft 16. The bearing is held against axial movement by means of a locking ring 26 which fits in the groove 17.

Our invention consists of the means to seal the bearing 19 in such manner that the built-in seals 23 thereof are more fully protected against the deteriorating effects of dirt and dust. To this end we provide first a sheet metal cup 27 which has an axially disposed skirt portion 28 which fits snugly in the inner end of the bore 13. The cup is provided with a centrally disposed opening 29 which fits with a close running fit about the axle 16.

The outer end of the bore 13 is sealed by our improved seal assembly indicated generally by the numeral 31. As shown, the seal assembly comprises generally a cup 32, which may be substantially identical with the cup 27 and which may be made of sheet metal and having an axially disposed skirt portion 33 which is pressed into the bore 13. Fitting in the cup is our improved seal 34 which may be formed of synthetic rubber of the like. On the face of the seal adjacent the inner face of the radially disposed portion of the cup 32 we provide a groove 36. The groove 36 is defined by the downwardly converging side walls as shown and the portion radially inward of the groove provides an annular sealing lip 37 which is adapted to fit snugly about and in running contact with the shaft. The seal may be provided with an undercut portion 38 thereby to provide clearance for the ring 26. The groove 36 is substantially V-shaped in radial cross section and slopes outwardly relative to the bearing. The inner face of the seal 34 may be further undercut as at 39.

Adapted to lie in the groove 36 is an O-ring 41 which is preferably also made of synthetic rubber or the like. The O-ring 41 is of such diameter both in overall configuration and in transverse cross section that when in place in the sloping wall groove 36 the ring normally projects slightly past the outer face of the seal 34. Therefore, when the seal 34 is placed in the cup 32 as shown and the parts assembled the O-ring is distorted by being compressed as indicated in the drawings. Due to the sloping wall configuration of the groove 36 the net effect of compressing the O-ring is to cause the sealing lip 37 to be pressed firmly and evenly into engagement with the shaft.

From the foregoing the method of constructing and using our improved seal and the advantages thereof will be readily understood and appreciated. The rear cup 27 is put in place by pressing the same into the bore, the radially disposed portion of the cup 27 contacting the shoulder 14. The bearing 19 is pressed into the bore 13 and the retaining ring 26 is put in place. Our improved seal is assembled with the seal proper in the cup 32 and with the O-ring in place as shown. The cup is now pressed into the outer end of the bore until it contacts the outer race of the bearing. The axially disposed portions 28 and 33 of the cups thus co-act with the shoulder 14 and the outer race of the bearing to form a definite, accurate stop when assembling the apparatus. When in place it will be apparent that the O-ring is distorted slightly by the fact that the thick peripheral portion 34a of the seal 34 contacts the side of the outer race to form a stop for the rubber seal itself. Thus, when assembled the O-ring in effect tends to tighten the sealing lip 37 about the axle. It will be understood, of course, that the inner race 22 stands still with the axle 16 whereas the rest of the bearing, the cups 27 and 32 together with the seal 34 and outer race of the bearing all rotate with the roll.

In actual practice we have found that a seal constructed in accordance with our invention is extremely effective in excluding dirt from the seals 23 of the bearing 19. It will be noted that our construction affords a space 42 at the inner side of the bearing in which there may be placed a quantity of lubricating material or the like such as heavy grease. Further, our construction affords a space 43 at the outer face of the bearing 19 in which similar lubricant or the like may be placed. These quantities of lubricant aid in excluding dirt as well as in preserving the built-in seals 23 of the bearing, adding further to the life of the bearing 19. It will be appreciated that any suitable form of semi-fluid material may be placed in the spaces 42 and 43 and we prefer to employ a material which remains substantially at the same viscosity throughout a large temperature range.

An idler roll for conveyor belts equipped with our improved seal has been found effective and long lived under the most adverse conditions of operation. By providing the resilient O-ring 41 we assure a continuing squeezing action of the lip 37 about the axle, thus compensating for wear of the lip and assuring a long period of protection for the bearing 19. It will be noted that by using the cup 27 alone at the inner end of the bore we eliminate the friction produced by one rubber seal. The metal cup 32 shields the rubber seal 34 against damage and also serves to press the O-ring into the groove 36, resiliently holding the sealing lip 37 in contact with the axle 16.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:
1. The combination with a cylindrically bored hub and an anti-friction bearing having an outer race fitting in the bore, of a seal for an end of the hub comprising a flanged cup with the flange pressed into the bore and into contact with a side of the outer race of the bearing for aiding in holding the bearing in place about an axle in the bore, a seal member of resilient material fitting snugly in the cup and having an inner face portion in contact with said side of the outer race of the bearing, an outwardly sloping annular sealing lip formed integrally with the seal and disposed to engage with a contact fit about the axle in the bore, and means interposed between the inner face of the cup and the outer sloping surface of the sealing lip urging the sealing lip into all-around contact with the axle.

2. The combination set forth in claim 1 in which the means urging the sealing lip into contact with the axle comprises an O-ring of resilient material interposed between the outwardly sloping surface of the sealing lip and the cup.

3. The combination with a cylindrically bored hub and an anti-friction bearing having an outer race fitting in the bore, of a seal for an end of the hub comprising a cup having a flanged portion pressed into the bore and into contact with a side of the outer race of the bearing for aiding in holding the bearing in place about an axle in the bore, a resilient seal member fitting snugly in the cup and having an inner peripheral portion spaced from the axle and in contact with said side of the outer race of the bearing whereby lubricant may be placed in the space between the peripheral portion and the axle for aiding in excluding foreign matter from the bearing, an outwardly sloping annular sealing lip formed integrally with the seal and disposed to engage with a contact fit about the axle, an annular groove in the outer face of said seal, and means in said annular groove contacting the inner face of the cup and urging the sealing lip into all-around contact with the axle.

References Cited in the file of this patent
UNITED STATES PATENTS

| 2,397,847 | Dodge | Apr. 2, 1946 |
| 2,565,923 | Hrdlicka | Aug. 28, 1951 |
| 2,647,808 | Spurgeon | Aug. 4, 1953 |

FOREIGN PATENTS

| 717,627 | Germany | Feb. 18, 1942 |
| 884,439 | Germany | July 27, 1953 |